July 17, 1951  L. H. SCHMOHL  2,560,897
VALVE OPERATING MEANS
Filed Dec. 11, 1944  4 Sheets-Sheet 1

Inventor
Leland H. Schmohl.
By Mason, Porter & Diller
Attorneys

July 17, 1951 L. H. SCHMOHL 2,560,897
VALVE OPERATING MEANS
Filed Dec. 11, 1944 4 Sheets-Sheet 2

Inventor
Leland H. Schmohl.
By Mason, Porter & Diller
Attorneys

Inventor
Leland H. Schmohl.

Inventor
Leland H. Schmohl.

By Mason, Porter & Diller
Attorneys

Patented July 17, 1951

2,560,897

UNITED STATES PATENT OFFICE 2,560,897

VALVE OPERATING MEANS

Leland H. Schmohl, Cleveland, Ohio, assignor to
The Parker Appliance Company, Cleveland,
Ohio, a corporation of Ohio Application December 11, 1944, Serial No. 567,684

6 Claims. (Cl. 318—467)

The invention relates generally to valve operating means, and, while subject to more general application, primarily seeks to provide a novel valve operating means adapted for incorporation in remotely controlled liquid fuel distributing systems.

In a known fluid distributing system there are included a valve casing having three ports through which fluid may be selectively directed, a rotor having a flow passage therethrough for selective cooperation with said ports and movable to any one of six selective positions of adjustment for this purpose, and power operated means for moving the rotor. It is the purpose of the present invention to provide a novel valve and drive combination in a unitary structure and including a novel Geneva couple for effecting the indexing of the valve rotor to its several selective positions of adjustment.

I am aware that Geneva movements are quite commonly used for indexing various machine and other power driven parts, but it is my purpose to provide a novel, compact Geneva movement mountable within the relatively small compass of the valve and drive housing and including a driven disk mounted directly on the stem of the valve rotor, and a driving crank for cooperating with said disk, said disk and crank being so constructed and cooperatively arranged that in the practical operation of the parts in indexing the valve rotor no substantial projection of the crank beyond the periphery of the disk will occur at any time.

In its more detailed nature the improved Geneva movement includes a disk having a shelf or face portion equipped with a central circular clearance or depression and six equidistantly spaced grooves communicating with and extending radially outwardly from said clearance, a crank rotatable about an axis disposed in substantially parallel relation to a line through the disk axis and having a roller extending therefrom in spaced relation to the crank axis and in position for moving through a portion of said clearance into a groove, outwardly and then inwardly in said groove while imparting a step movement to the disk and then back into said clearance during each rotation of the crank.

Another object of the invention is to provide an improved Geneva movement of the character stated in which the face or shelf portion intermediately of each adjacent pair of radial grooves is provided with an upstanding segment having an inwardly presented arcuate lock face, and the crank includes an arcuate lock piece engageable with the successively presented lock faces intermediately of effective indexing engagements of the roller in the grooves for locking the disk against movement intermediately of the indexing movements imparted thereto.

Another object of the invention is to provide a unitary valve and drive structure of the character stated in which the Geneva disk is mounted directly on the valve rotor stem and the indexing crank is driven by an electric motor through reduction gearing, the valve, a housing for the Geneva disk and crank, the gearing and the motor all being assembled in a compact unit.

Another object of the invention is to provide a valve operating means of the character stated in which there is included a head fixed on the valve rotor stem and having a face engaging and forming a rest for the Geneva disk, said disk being loosely mounted on said stem, and the opposing faces of said disk and head having cooperating spring pressed detent and recess equipments providing a slip clutch drive connection between the disk and the valve rotor.

With the above and other objects in view that will hereinafter appear, the nature of the invention will be more clearly understood by reference to the following detailed description, the appended claims, and the several views illustrated in the accompanying drawings.

Figure 3:
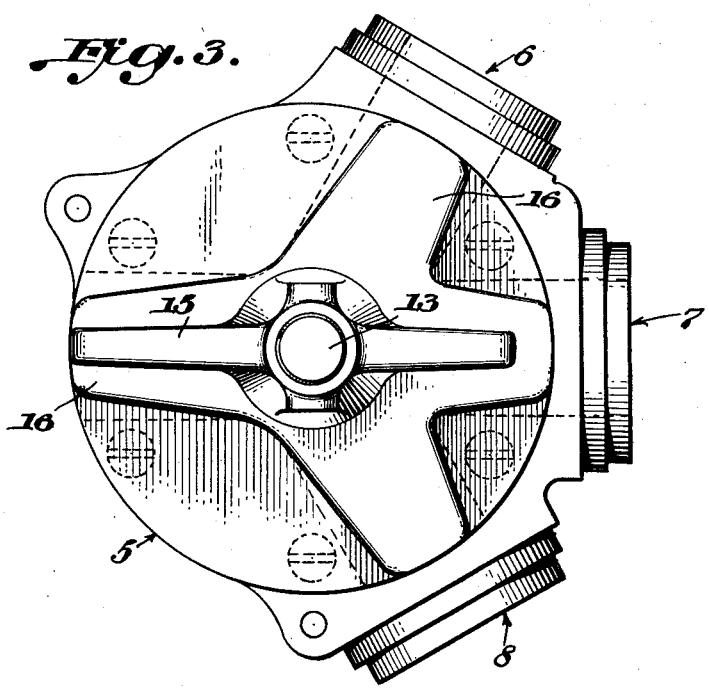
Figure 3 is an inverted plan view of the structure illustrated in Figure 1.

In the example of embodiment of invention herein disclosed the valve operating unit includes a valve casing 5 having three ports designated 6, 7 and 8 respectively arranged in a common plane and equidistantly spaced 60 degrees apart as shown in Figure 3.

The casing includes a rotor chamber 9 in which a rotor 10 is mounted. The rotor is equipped with a flow passage 11 which is sort of crow foot in shape providing three passage portions grouped in 60 degree spaced relation so as to be subject to being simultaneously placed in registry with the three casing ports designated 6, 7 and 8, and a fourth portion opening through the opposite side of the rotor in axial alignment with the centrally arranged crow foot passage portion. The shape of the flow passage 11 is best illustrated in dotted lines in Figure 3. In this particular disclosure provision is made for indexing the valve rotor in one direction or the other to any one of six selective positions, and by reason of the illustrated arrangement of the casing ports and the rotor flow passage it is possible to provide for fluid flow between any selected two ports, between all three ports, or none of said ports.

The lower end of the casing 5 is closed by a removal cap 12, and the rotor 10 includes a depending stem 13 which is rotatable in a bearing 14 provided therefor in the cap 12. The stem 13 extends below the cap 12 and has an emergency handle 15 affixed thereon. The depending stem portion also has a plate 16 fixed thereon, and it will be apparent by reference to Figure 3 of the drawings that this plate is either shaped or marked to indicate the position of the crow foot flow passage 11 in the rotor 10. In this manner it is possible for an observer to note the position of the plate 16 with relation to the valve ports placed in the manner clearly illustrated in Figure 3, and by this means to determine the exact position of the valve rotor and the arrangement of the flow passage portions with respect to said ports. While the rotor is intended to be electrically and remotely controlled, the handle 15 may be employed under certain emergency conditions for manually operating the valve.

The top of the casing is closed by a cap 17 which forms the base of a housing portion 18, and the valve rotor 10 has a stem 19 extending upwardly and having rotative bearing at 20 in said cap. The stem 19 extends upwardly into the interior of the housing 18 wherein it has a control head 21 fixed thereon. The head 21 is equipped at one point on its periphery with a clearance 22 paralleling the axis of the stem 19 and the purpose of which will later become apparent. A Geneva plate 23 is loosely mounted on the upper end of the stem 19, being retained thereon by a retainer ring 24.

The casing 17 is provided with a counterbore 25 in which a radially apertured ring 26 is mounted between two sealing rings 27. It will be apparent by reference to Figure 1 of the drawings that the ring 26 is peripherally grooved to provide an annular chamber in the counterbore 25, and this counterbore communicates with radial vents 28 formed in the casing base 17. In this manner leakage of fuel from within the valve casing 5 into the interior of the housing 18 is prevented by the sealing rings 27, and by reason of the provision of the vents 28, any fuel leaking past the bottom ring 27 will not have opportunity to build up in pressure so as to leak past the upper ring 27 into the interior of the housing 18.

Figure 1:
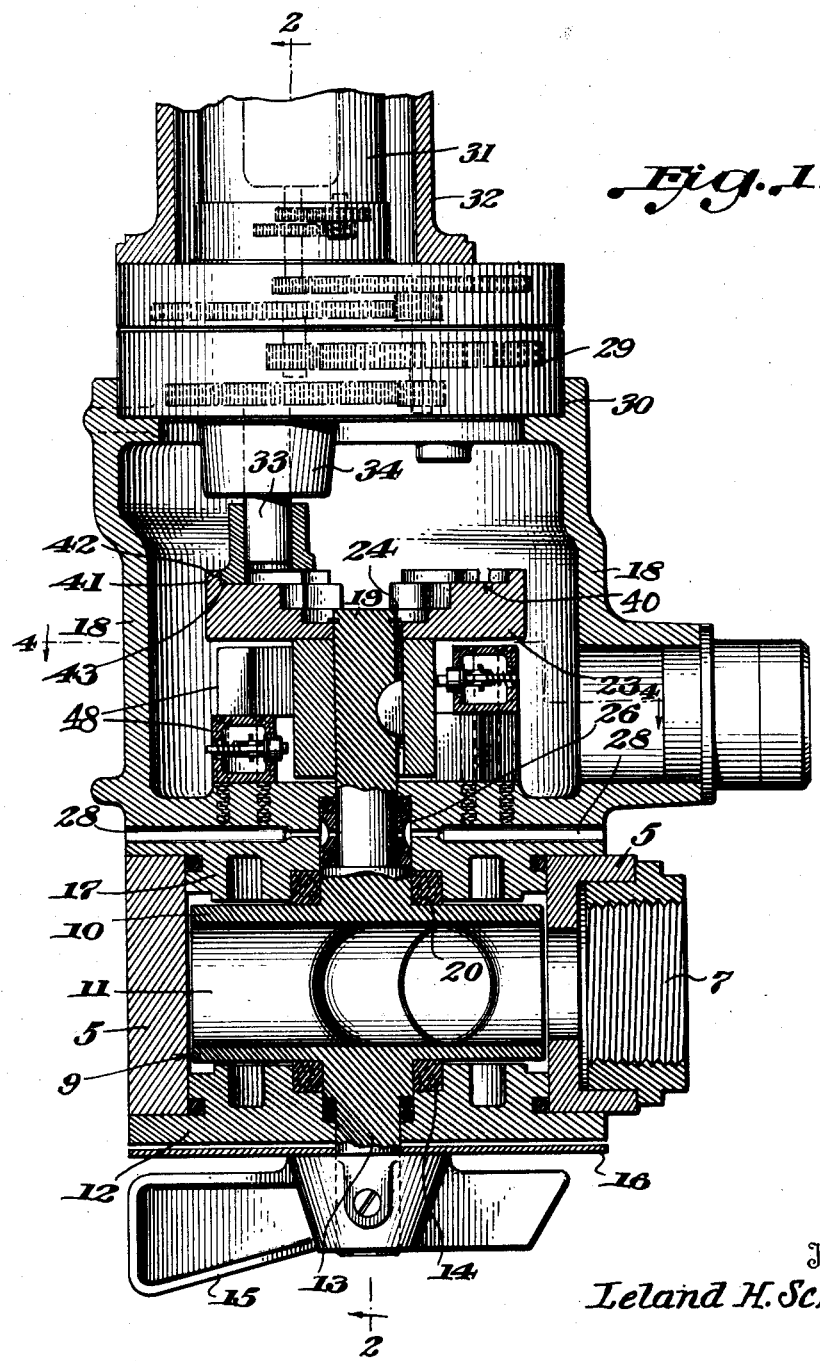
Figure 1 is a central vertical cross sectional view illustrating a valve operating means embodying the invention.
Figure 2:
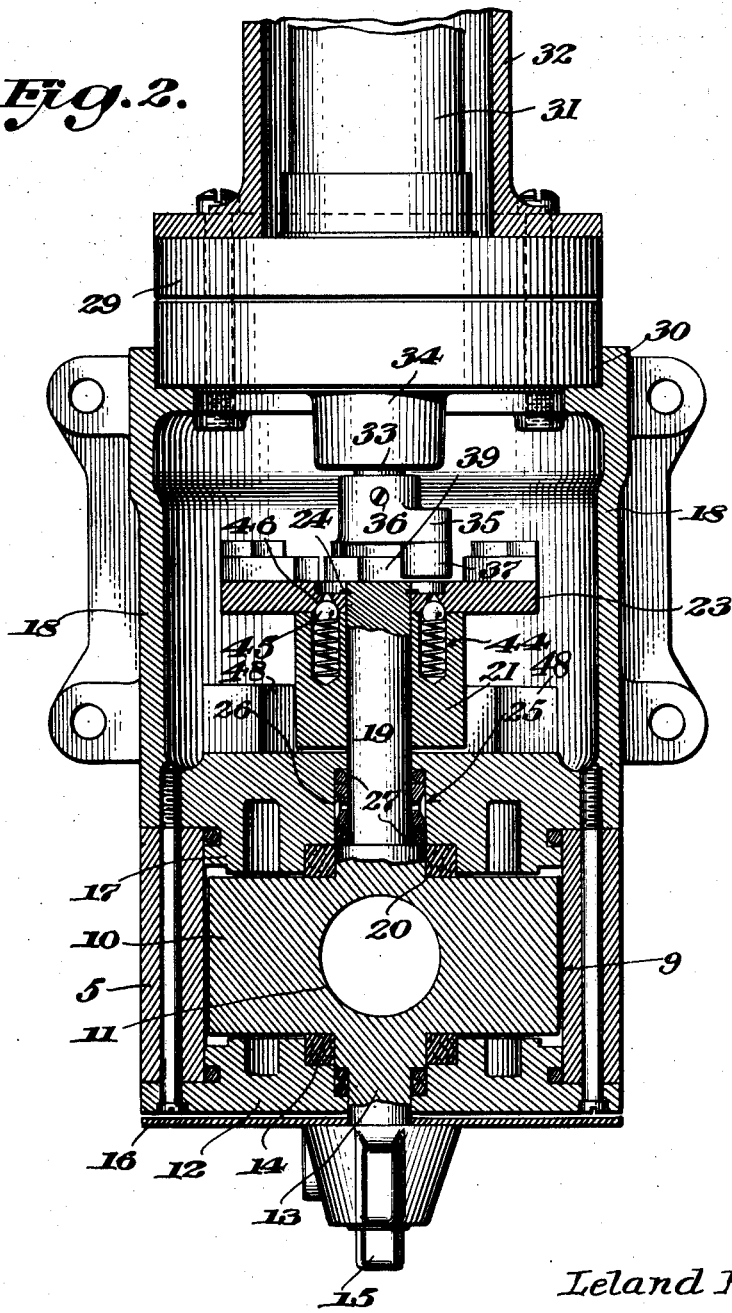
Figure 2 is a vertical cross section taken on the line 2—2 of Figure 1.

A reduction gearing unit 29 is mounted as at 30 atop the casing 18, and an electric motor 31 is mounted on the unit 29 in the manner clearly illustrated in Figures 1 and 2. The motor may be protected by a surrounding housing 32. It is preferred that a 1/50 horse power motor of the split field reversing type be employed, and in conjunction with such a motor designed to operate at 12,000 R. P. M., a suitable reduction gearing mechanism having a 1,200 to 1 reduction capacity will be used so as to cause the power output shaft 33 of the drive equipment to rotate at 10 R. P. M. As shown in Figures 1 and 2 the power output shaft 33 extends through an off center bearing 34 and has an actuator crank 35 secured thereon as at 36. A roller 37 depends from the free end of the crank and constitutes a part of the Geneva movement including the previously described Geneva disk 23. The crank roller 37 is engageable in the six equidistantly spaced radial grooves 38 provided in the disk 23, all said grooves leading into a circular central clearance 39. It will be apparent by reference to Figures 1, 2 and 5 to 8 that the grooves 38 are formed in a shelf portion 40 of the Geneva disk 23. Between each two grooves 38 a segment 41 projects upwardly from the disk 23 at the periphery thereof, and each said segment has an inwardly directed arcuate lock face 42, which is engageable in the manner clearly illustrated in Figures 5 to 8 by an arcuate lock piece 43 carried by the crank 35.

Figure 5:
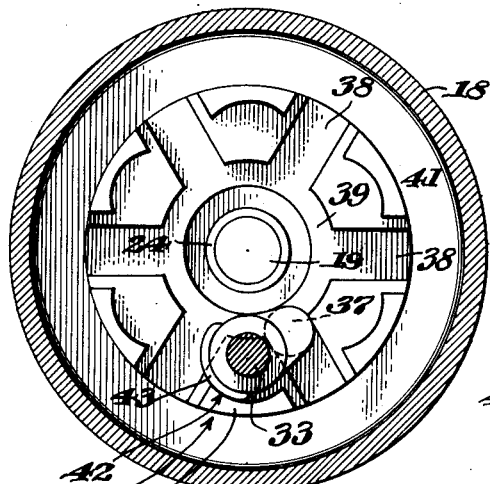
Figure 5 is a horizontal sectional view illustrating the valve rotor operating Geneva disk of the valve actuator means, the disk actuating crank being in position for starting an indexing movement of the disk.
Figure 6:
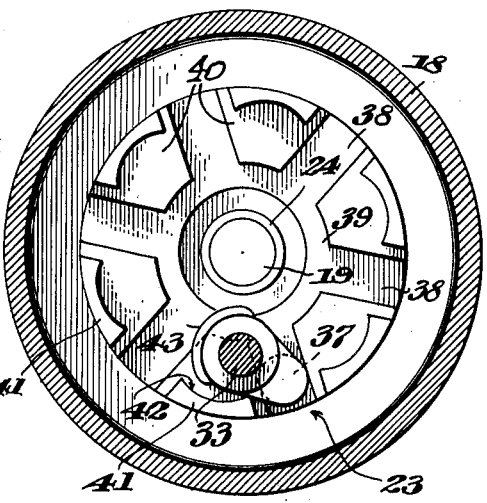
Figures 6 and 7 are views similar to Figure 5 illustrating stages of an indexing movement of the valve rotor operated Geneva disk.
Figure 7:
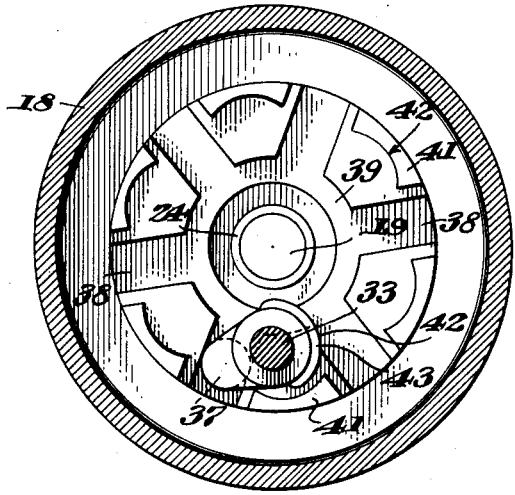
Figure 8:
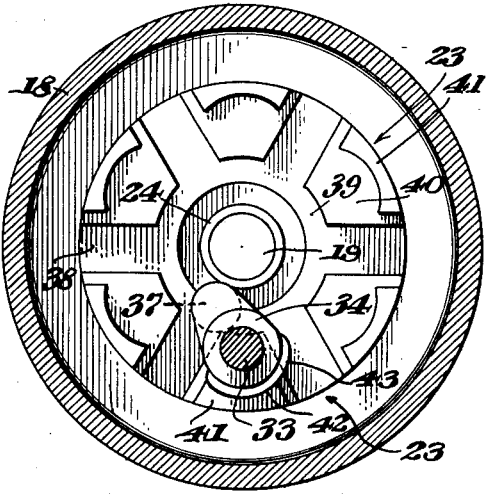
Figure 8 is a view similar to Figures 5 to 7, the crank being in a disk locking position.

It will be apparent by reference to Figures 5 to 8 that each time the motor 31 is operated to drive the shaft 33 to effect a valve position selecting indexing cycle, the crank 35 will be turned clockwise as viewed in said figures so as to first present the roller 37 in the inner end of one of the radial grooves 38 in the manner shown in Figure 5. As the roller engages the side wall defining the groove in the direction toward which the Geneva disk 23 is to be turned it will initiate an indexing movement of said disk. The condition of the parts just prior to the initiation of the indexing movement is illustrated in Figure 5, two stages of the progress of a single indexing step are shown in Figures 6 and 7, and in Figure 8 the condition of the parts just after the completion of an indexing step are shown. In said Figure 8 the lock piece 43 is shown in effective engagement with the adjacent lock face 42 of the disk 23 for holding the disk and the attached valve rotor substantially in the position to which they have been indexed. It will be obvious that one or more indexing steps will be imparted to the disk 23, in one direction or the other, according to the position of the distributing valve rotor to be obtained.

Figure 4:
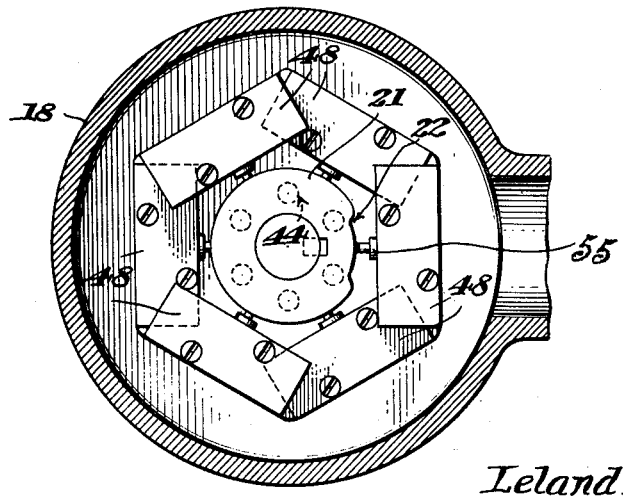
Figure 4 is a horizontal section taken on the line 4—4 of Figure 1.

It will be apparent by reference to Figures 2 and 4 of the drawings that a plurality of recesses 44 are provided in spaced relation about the center of the head 21, and in said recess is mounted a spring pressed ball 45. The spring pressed balls 45 engage in recesses 46 formed in the bottom of the Geneva disk 23, and in this manner a slip drive connection is provided between the Geneva disk and the valve rotor and the attached head 21. This yieldable connection is such that under normal conditions the valve rotor 10 is rotated in unison with the driving disk 23. However, in the event of freezing of the rotor, or some mechanical damage rendering the rotor difficult to operate, the Geneva disk 23 will ride over the balls 45 and continue turning without causing damage to the electric motor 31. Under such conditions the valve rotor 10 can be turned manually, rotation of the rotor with respect to the Geneva disk 23 being permitted by the yieldable connection at 45. The emergency handle 15 is convenient also in the event of failure of the electrical control for the motor. If the turning torque is normally 20 inch pounds, then the yielding connection may be arranged to permit relative rotation between the valve rotor 10 and the Geneva disk 23 when more than 80 inch pounds is required to turn said rotor. In this manner, slippage will occur only when the torque required to turn the valve rotor is considerably more than normal.

Six motor cut out switches 48 are grouped about the head 21 within the housing 18, being secured to the housing base portion or cap 17 in the manner clearly illustrated in Figures 1 and 4 in the form of a hexagonal ring. These switches correspond in number to the selective positions to which the valve rotor 10 can be turned as hereinbefore described, and the structure of these switch elements will be explained later.

The motor cut out switches may be connected in any approved control circuits effective to automatically discontinue the flow of current to the motor each time the valve rotor reaches the position to which it is to be turned.

Figure 9:
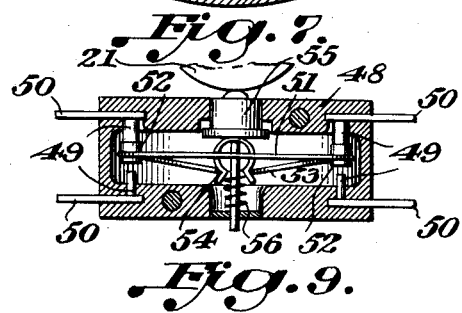
Figure 9 is a fragmentary horizontal sectional view illustrating one of the cut out switches.
Figure 10:
Figure 10 is a detail view illustrating one of the contact making and breaking leaf spring members included in the cut out switch elements.

The internal construction of the motor cut out switches 48 is well known in the art and is illustrated in detail in Figures 9 and 10. In an example electrical control system selector switches of said system (not shown) and the motor cut out switches of the motor drive unit herein disclosed may be reversely connected in the control circuits so that when a given selector switch is closed, the corresponding motor cut out switch will automatically open and break the selected motor driving circuit when the head clearance 22 comes opposite the button of the particular cut out switch as the associated valve rotor reaches the position for which the controls are adjusted. It will thus be apparent that the Geneva disk 23 and its radial slots 38 are so cooperatively arranged with relation to the circle of switches 48 and their buttons 55, and the head 21 and its clearance 22, that each stop station on said disk or stationary position thereof will place the head clearance 22 opposite one switch button 55 as shown in Figure 4.

As illustrated in Figures 9 and 10, each of the switches 48 includes four contacts 49 arranged in spaced pairs and connected with connector terminals 50 by which connection with the electrical conductors can be effected in the well known manner. Between the opposed pairs of contacts 49, there is mounted a leaf spring contactor 51 having contacts or buttons 52 at its ends and being provided with inwardly opposing spring leaves 53 which engage as at 54 with the respective actuator button 55. A coil spring 56 constantly urges the button 55 against the head 21 so that when the clearance 22 comes opposite the button, said spring will be effective to reverse the position of the contactor element 51 from its position in contact with the inwardly disposed pair of contacts 49 to a position in which it will contact the outwardly disposed pair of contacts 49; thereby to open the selected control circuit and stop rotation of the motor, the Geneva drive and the valve rotor.

In the foregoing description there is disclosed a simple and compact unitary structure comprising a valve and a novel operating means therefor, in which the valve casing, the drive casing, the reduction gearing and the motor are secured in a compact unitary assembly. There is also disclosed a novel form of Geneva drive couple for imparting indexing movement to the valve rotor including a disk and crank equipment so constructed and cooperatively arranged that in the practical operation of the couple in indexing the valve rotor no substantial projection of the crank beyond the periphery of the disk will occur at any time. This particular form of Geneva movement presents advantages because of the provision of a much shorter center distance between the driving pin and the drive shaft whereby much greater turning torque is transmitted to the disk by a given torque on the drive shaft. There is also disclosed a novel arrangement in which the Geneva disk is connected in driving relation with the valve rotor through a slip clutch.

While one form of the invention has been shown for purposes of illustration, it is to be clearly understood that various changes in the details of construction and arrangement of parts may be made without departing from the spirit and scope of the invention as defined in the appended claims.

I claim:

1. In a unit of the character described, a drive couple comprising, a drive shaft, a driven shaft, a disk mounted on the driven shaft and including a shelf portion equipped with a central circular clearance and a plurality of equidistantly spaced grooves communicating with and extending radially outwardly from said clearance, said shelf portion being provided intermediately of each adjacent pair of radial grooves with an upstanding segment having an inwardly presented arcuate lock face, said shafts being cooperatively arranged so that lines extended along their axes bear generally parallel spaced relation, with the line extended from the drive shaft axis being disposed inwardly of the periphery of the disk, a carrier hub on said drive shaft disposed to closely sweep over said shelf and having all portions thereof confined within the peripheral limits of said disk and being equipped with a crank projecting radially therefrom and a roller extending from said crank toward the disk in spaced relation to the crank axis and in position for moving through a portion of said clearance into one of the grooves, then outwardly and then inwardly in said one groove while imparting an indexing movement to the disk, and then back into said clearance during one rotation of the drive shaft, said hub having an arcuate lock portion engageable with the successively presented lock faces intermediately of effective indexing engagements of the roller in the grooves for locking the disk against movement intermediately of the indexing movements imparted thereto.

2. In a unit of the character described, a drive couple comprising, a drive shaft, a driven shaft, a disk mounted on the driven shaft and including a shelf portion equipped with a central circular clearance and a plurality of equidistantly spaced grooves communicating with and extending radially outwardly from said clearance, said shelf portion being provided intermediately of each adjacent pair of radial grooves with an upstanding segment having an inwardly presented arcuate lock face, said shafts being cooperatively arranged so that lines extended along their axes bear generally parallel spaced relation, with the line extended from the drive shaft axis being disposed inwardly of the periphery of the disk, and a carrier hub on said drive shaft disposed to closely sweep over said shelf and having all portions thereof confined within the peripheral limits of said disk and being equipped with a crank projecting radially therefrom and a roller extending from said crank toward the disk in spaced relation to the crank axis and in position for moving through a portion of said clearance into one of the grooves, then outwardly and then inwardly in said one groove while imparting an indexing movement to the disk, and then back into said clearance during one rotation of the drive shaft, said hub having an arcuate lock portion engageable with the successively presented lock faces intermediately of effective indexing engagements of the roller in the grooves for locking the disk against movement intermediately of the indexing movements imparted thereto, said disk being connected in driving relation on the shaft on which it is mounted by a slip coupling.

3. In a unit of the character described, an elongated generally cylindriform housing structure having a rotor chamber in one end thereof, said housing also having a drive chamber in the other end thereof and isolated by a cross wall from said rotor chamber, a rotor rotatably mounted in the rotor chamber and selectively presentable to a multiple of positions and a driven shaft extending from the rotor through said cross wall into said drive chamber, and means including a motor and reduction gear unit mounted on and forming a closure for said other end of said housing with the motor axis paralleling the axis of the housing structure and with all parts of the motor and reduction gear unit disposed within the peripheral limits of said housing structure, drive devices in said drive chamber for driving said rotor, and including a motor shaft, reduction gearing in said gear unit and having a drive shaft extending from said gear unit into said drive chamber, a disk mounted on the driven shaft and including a shelf portion equipped with a central circular clearance and a plurality of equidistantly spaced grooves communicating with and extending radially outwardly from said clearance, said shelf portion being provided intermediately of each adjacent pair of radial grooves with an upstanding segment having an inwardly presented arcuate lock face, said shafts being cooperatively arranged so that lines extended along their axes bear generally parallel spaced relation, with the line extended from the drive shaft axis being disposed inwardly of the periphery of the disk, and a crank on said drive shaft having a roller extending therefrom toward the disk in spaced relation to the crank axis and in position for moving through a portion of said clearance into one of the grooves, then outwardly and then inwardly in said one groove while imparting an indexing movement to the disk, and then back into said clearance during one rotation of the drive shaft, said crank having an arcuate lock portion engageable with the successively presented lock faces intermediately of effective indexing engagements of the roller in the grooves for locking the disk against movement intermediately of the indexing movements imparted thereto.

4. Structure as defined in claim 3 in which there is included a head mounted on the driven shaft directly below the radially grooved disk for rotation therewith within the drive chamber, a plurality of cut out switch units arranged in a circle about said head and within said drive chamber and each including a radially inwardly projecting actuator plunger said head having a circular peripheral portion opposing and adapted to contact said switch plungers and having a plunger releasing clearance at one portion of said peripheral portion and so related to the radial grooves in the disk that said plunger releasing clearance will come opposite one of the switch plungers each time the disk comes to rest.

5. Structure as defined in claim 3 in which there is included a head mounted on the driven shaft directly below the radially grooved disk for rotation therewith within the drive chamber, a plurality of cut out switch units arranged in a circle about said head and within said drive chamber and each including a radially inwardly projecting actuator plunger, said head having a circular peripheral portion opposing and adapted to contact said switch plungers and having a plunger releasing clearance at one portion of said peripheral portion and so related to the radial grooves in the disk that said plunger releasing clearance will come opposite one of the switch plungers each time the disk comes to rest, the disk being loosely mounted on the driven shaft with a face portion thereof opposing a face portion of said head, and the opposing face portions of said disk and head having cooperating spring pressed detent and recess equipments providing a slip clutch drive connection between the disk and the rotor.

6. Structure as defined in claim 3 in which there is included a head mounted on the driven shaft directly below the radially grooved disk for rotation therewith within the drive chamber, the disk being loosely mounted on the driven shaft with a face portion thereof opposing a face portion of said head, and the opposing face portions of said disk and head having cooperating spring pressed detent and recess equipments providing a slip clutch drive connection between the disk and the rotor, said detent and recess equipments being placed relatively to the selective positions to which the rotor is to be turned so as to determine and yieldably maintain definite selected positions of the rotor.

LELAND H. SCHMOHL.

REFERENCES CITED

The following references are of record in the file of this patent:

UNITED STATES PATENTS

| Number | Name | Date |
| --- | --- | --- |
| 1,045,102 | Armstrong | Nov. 19, 1912 |
| 1,074,362 | Holst | Sept. 30, 1913 |
| 1,347,492 | Bredenberg | July 27, 1920 |
| 1,611,091 | Wensley | Dec. 14, 1926 |
| 1,928,384 | McCanna | Sept. 26, 1933 |
| 1,954,218 | Morrow | Apr. 10, 1934 |
| 2,235,287 | Daniels | Mar. 18, 1941 |